US010105731B2

(12) United States Patent
Ettlin (10) Patent No.: US 10,105,731 B2
(45) Date of Patent: Oct. 23, 2018

(54) CARTRIDGE, METHOD OF MANUFACTURING SAME AND MULTICOMPONENT CARTRIDGE

(75) Inventor: Josef Ettlin, Eichberg (CH)

(73) Assignee: SULZER MIXPAC AG, Haag (CH)

( * ) Notice: Subject to any disclaimer, the term of this patent is extended or adjusted under 35 U.S.C. 154(b) by 17 days.

(21) Appl. No.: 14/126,704

(22) PCT Filed: Aug. 20, 2012

(86) PCT No.: PCT/EP2012/066190
§ 371 (c)(1),
(2), (4) Date: Dec. 16, 2013

(87) PCT Pub. No.: WO2013/056872
PCT Pub. Date: Apr. 25, 2013

(65) Prior Publication Data
US 2014/0117046 A1  May 1, 2014

(30) Foreign Application Priority Data

Oct. 17, 2011  (EP) .................................. 11185380

(51) Int. Cl.
*B67D 7/74* (2010.01)
*B05C 17/01* (2006.01)
(Continued)

(52) U.S. Cl.
CPC ........ *B05C 17/01* (2013.01); *B05C 17/00553* (2013.01); *B29D 22/003* (2013.01);
(Continued)

(58) Field of Classification Search
CPC .............................. B05C 17/01; B67D 7/741
(Continued)

(56) References Cited

U.S. PATENT DOCUMENTS 2,236,727 A * 4/1941 Dewees .................. 222/386
3,166,221 A * 1/1965 Helmuth .................. 222/137
(Continued)

FOREIGN PATENT DOCUMENTS

EA  200800734 A1  10/2008
EP  0413049 A1 *  2/1991  ............. B65D 25/14
(Continued)

OTHER PUBLICATIONS

International Preliminary Report of Patentability from the International Bureau dated May 1, 2014.
(Continued)

*Primary Examiner* — Patrick M Buechner
*Assistant Examiner* — Michael J Melaragno
(74) *Attorney, Agent, or Firm* — Global IP Counselors, LLP (57) ABSTRACT

A cartridge is provided having at least one reception chamber (2), which extends in the longitudinal direction, for a medium to be dispensed, having an end face (4) and a cartridge wall (3) which bound the reception chamber (2) and which are injection molded in one piece, with the end face (4) having an outlet for the medium, and with the cartridge wall (3) having a first film (6) at its inner side bounding the reception chamber (2) which extends over the total cartridge wall (3) and is non-releasably connected to the cartridge wall (3). A method of manufacturing such a cartridge as well as a multicomponent cartridge are furthermore provided by the invention.

18 Claims, 9 Drawing Sheets

(51) Int. Cl.
  *B05C 17/005* (2006.01)
  *B29D 22/00* (2006.01)
  *B65D 81/32* (2006.01)

(52) U.S. Cl.
  CPC .......... *B65D 81/325* (2013.01); *B67D 7/741* (2013.01); *B05C 17/00559* (2013.01)

(58) Field of Classification Search
  USPC .......................... 222/327, 326, 386; 220/626
  See application file for complete search history.

(56) References Cited

U.S. PATENT DOCUMENTS

| | | | | |
|---|---|---|---|---|
| 3,272,401 | A | * | 9/1966 | Fendler et al. .............. 222/326 |
| 3,288,333 | A | * | 11/1966 | Valk, Jr. ..................... 222/95 |
| 3,311,265 | A | * | 3/1967 | Creighton, Jr. et al. ....... 222/137 |
| 3,323,682 | A | * | 6/1967 | Creighton, Jr. et al. ........ 222/94 |
| 3,662,944 | A | * | 5/1972 | Joosten, Sr. ................. 220/62.2 |
| 3,767,085 | A | * | 10/1973 | Cannon et al. ................ 222/82 |
| 3,815,791 | A | * | 6/1974 | Clark ......................... 222/326 |
| 3,946,914 | A | * | 3/1976 | Ravn .......................... 222/574 |
| 4,182,457 | A | * | 1/1980 | Yamada et al. ............... 428/36.6 |
| 4,261,473 | A | * | 4/1981 | Yamada et al. ............... 215/379 |
| 4,373,646 | A | * | 2/1983 | MacEwen ..................... 222/327 |
| 4,386,717 | A | * | 6/1983 | Koob .......................... 222/94 |
| 4,398,642 | A | * | 8/1983 | Okudaira et al. ............ 428/35.7 |
| 4,426,022 | A | * | 1/1984 | Lang et al. .................. 222/130 |
| 4,451,512 | A | * | 5/1984 | Yazaki et al. ............... 428/36.6 |
| 4,501,781 | A | * | 2/1985 | Kushida et al. ............. 215/12.2 |
| 4,528,219 | A | * | 7/1985 | Yamada et al. ............... 428/36.6 |
| 4,564,541 | A | * | 1/1986 | Taira et al. ................... 428/35.4 |
| 4,566,610 | A | * | 1/1986 | Herb .......................... 222/137 |
| 4,595,129 | A | * | 6/1986 | Okuno et al. ................ 222/327 |
| 4,604,307 | A | * | 8/1986 | Spreeuwers ................. 428/34.2 |
| 4,617,240 | A | * | 10/1986 | Krueger et al. ........... 428/476.1 |
| 4,743,479 | A | * | 5/1988 | Nakamura et al. .......... 428/36.7 |
| 4,776,458 | A | * | 10/1988 | Summons et al. ............ 222/386 |
| 4,948,016 | A | * | 8/1990 | Summons et al. ............ 222/158 |
| 4,989,758 | A | * | 2/1991 | Keller ........................ 222/137 |
| 5,016,784 | A | * | 5/1991 | Batson ........................ 222/386 |
| 5,033,650 | A | * | 7/1991 | Colin et al. .................. 222/94 |
| 5,080,262 | A | * | 1/1992 | Herold et al. ............... 222/135 |
| 5,082,147 | A | * | 1/1992 | Jacobs ........................ 222/137 |
| 5,104,005 | A | * | 4/1992 | Schneider et al. ........... 222/137 |
| 5,295,613 | A | * | 3/1994 | Barthomeuf et al. ........ 222/137 |
| 5,314,092 | A | * | 5/1994 | Jacobsen et al. ............. 222/137 |
| 5,333,760 | A | * | 8/1994 | Simmen ....................... 222/137 |
| 5,335,827 | A | * | 8/1994 | Gentile ....................... 222/137 |
| 5,336,014 | A | * | 8/1994 | Keller ........................ 403/24 |
| 5,401,169 | A | * | 3/1995 | Fleisher et al. ............... 433/90 |
| 5,425,817 | A | * | 6/1995 | Mugge et al. ................. 138/137 |
| 5,487,940 | A | * | 1/1996 | Bianchini et al. ............ 428/349 |
| 5,566,860 | A | * | 10/1996 | Schiltz et al. ................ 222/94 |
| 5,609,271 | A | * | 3/1997 | Keller et al. .............. 222/145.6 |
| 5,667,102 | A | * | 9/1997 | Keller ........................ 222/95 |
| 5,688,570 | A | * | 11/1997 | Ruttinger, Sr. ............. 428/35.7 |
| 5,875,928 | A | * | 3/1999 | Muller et al. ................. 222/82 |
| 5,894,041 | A | * | 4/1999 | Cornell ....................... 428/35.7 |
| 6,065,645 | A | * | 5/2000 | Sawhney et al. ............. 222/137 |
| 6,129,244 | A | * | 10/2000 | Horth ......................... 222/94 |
| 6,158,621 | A | * | 12/2000 | Keller ........................ 222/95 |
| 6,290,101 | B1 | * | 9/2001 | Chang ........................ 222/137 |
| 6,299,022 | B1 | * | 10/2001 | Bublewitz et al. .......... 222/83.5 |
| 6,311,871 | B1 | * | 11/2001 | Binder ....................... 222/145.6 |
| 6,422,427 | B2 | * | 7/2002 | Brown et al. ................. 222/255 |
| 6,443,612 | B1 | * | 9/2002 | Keller ........................ 366/307 |
| 6,564,970 | B1 | * | 5/2003 | Walch et al. .................. 222/82 |
| 6,598,764 | B1 | * | 7/2003 | Stern .......................... 222/95 |
| 6,736,290 | B2 | * | 5/2004 | Ichikawa et al. ............. 222/105 |
| 6,824,016 | B2 | * | 11/2004 | Muhlbauer et al. ........... 222/137 |
| 7,527,421 | B2 | * | 5/2009 | Anderson et al. ............. 366/69 |
| 7,694,853 | B2 | * | 4/2010 | Keller ........................ 222/137 |
| 8,100,295 | B2 | * | 1/2012 | Keller ........................ 222/137 |
| 8,297,474 | B2 | | 10/2012 | Schell |
| 8,313,006 | B2 | * | 11/2012 | Willner et al. ................ 222/94 |
| 8,657,141 | B2 | * | 2/2014 | Habibi-Naini ............. 220/254.3 |
| 2002/0125249 | A1 | * | 9/2002 | Baird-Smith et al. ..... 220/258.1 |
| 2002/0170926 | A1 | * | 11/2002 | Horner et al. ................ 222/137 |
| 2004/0178225 | A1 | | 9/2004 | Ichikawa et al. |
| 2004/0226968 | A1 | * | 11/2004 | Lafond ........................ 222/327 |
| 2005/0006413 | A1 | * | 1/2005 | Miyata et al. ................ 222/327 |
| 2005/0019545 | A1 | * | 1/2005 | Riebel ....................... C08L 3/02 428/304.4 |
| 2005/0087565 | A1 | * | 4/2005 | Nehren ........................ 222/325 |
| 2005/0087570 | A1 | * | 4/2005 | Jackman .................... 222/541.4 |
| 2005/0101963 | A1 | * | 5/2005 | Merboth et al. ............... 606/92 |
| 2006/0054636 | A1 | * | 3/2006 | Brennan et al. ............... 222/137 |
| 2006/0091157 | A1 | * | 5/2006 | Nomula, Sr. ................ 222/326 |
| 2006/0091158 | A1 | * | 5/2006 | Coker et al. ................. 222/327 |
| 2006/0124577 | A1 | * | 6/2006 | Ross et al. ................... 215/347 |
| 2006/0138166 | A1 | | 6/2006 | Nehren et al. |
| 2006/0246127 | A1 | * | 11/2006 | Freier .................. A61K 9/4816 424/451 |
| 2007/0228076 | A1 | * | 10/2007 | Horner et al. ................ 222/135 |
| 2007/0235475 | A1 | * | 10/2007 | Schneider et al. ............ 222/325 |
| 2008/0156831 | A1 | * | 7/2008 | Nakayama et al. .......... 222/327 |
| 2009/0039112 | A1 | * | 2/2009 | Robertson et al. ........... 222/326 |
| 2009/0057338 | A1 | * | 3/2009 | Knee et al. ................... 222/94 |
| 2009/0134186 | A1 | * | 5/2009 | Keller ........................ 222/137 |
| 2009/0218372 | A1 | * | 9/2009 | De Man et al. ............... 222/391 |
| 2009/0302055 | A1 | * | 12/2009 | Cadden et al. .................. 222/1 |
| 2010/0032082 | A1 | * | 2/2010 | Ho et al. ...................... 156/222 |
| 2010/0206904 | A1 | | 8/2010 | Staub et al. |
| 2010/0276458 | A1 | * | 11/2010 | Buck .......................... 222/327 |
| 2011/0049154 | A1 | * | 3/2011 | Michalsky .................. 220/288 |
| 2011/0094526 | A1 | * | 4/2011 | Marshall .................. D01F 2/00 131/332 |
| 2011/0253713 | A1 | * | 10/2011 | Ichikawa et al. ........... 220/62.11 |
| 2011/0259887 | A1 | * | 10/2011 | Gotoh et al. ................. 220/266 |
| 2012/0037658 | A1 | * | 2/2012 | Gordon et al. ................... 222/1 |
| 2012/0104044 | A1 | * | 5/2012 | Pappalardo ............... 222/145.5 |
| 2012/0107577 | A1 | * | 5/2012 | Sachs et al. ................ 428/195.1 |
| 2012/0175384 | A1 | * | 7/2012 | Greter et al. ................. 222/137 |
| 2012/0279988 | A1 | * | 11/2012 | Hiemer ........................ 222/82 |
| 2013/0092697 | A1 | * | 4/2013 | Guzzi et al. ................. 220/626 |
| 2013/0105515 | A1 | * | 5/2013 | Frey et al. ................... 222/137 |
| 2013/0161353 | A1 | * | 6/2013 | Baldelli ....................... 222/137 |
| 2013/0270143 | A1 | * | 10/2013 | Muscato et al. ........... 206/459.5 |
| 2014/0091094 | A1 | * | 4/2014 | Habibi-Naini et al. ...... 220/500 |
| 2014/0117046 | A1 | * | 5/2014 | Ettlin ....................... 222/145.5 |
| 2014/0158717 | A1 | * | 6/2014 | Ettlin ........................ 222/327 |
| 2014/0203023 | A1 | * | 7/2014 | Ettlin ........................ 220/507 |
| 2015/0175329 | A1 | * | 6/2015 | Wilke .................. B65D 65/466 206/438 |

FOREIGN PATENT DOCUMENTS

| | | |
|---|---|---|
| EP | 0413049 A1 | 2/1991 |
| EP | 0 721 805 A3 | 7/1996 |
| EP | 3721805 A2 | 7/1996 |
| EP | 1762507 A2 | 3/2007 |
| JP | 07-256178 | 10/1995 |
| JP | 7256178 A | 10/1995 |
| JP | 2006008252 A | 1/2006 |
| JP | 2006059628 A | 3/2006 |
| JP | 2008019006 A | 1/2008 |
| JP | 2008538344 A1 | 10/2008 |
| JP | 2010064791 A | 3/2010 |
| JP | 2010208193 A | 9/2010 |
| RU | 2010105089 A | 8/2011 |
| WO | 2006111297 A1 | 10/2006 |

OTHER PUBLICATIONS

International Search Report for International Patent Application No. PCT/EP2012/066190 dated Oct. 4, 2012.
Written Opinion for International Patent Application No. PCT/EP2012/066190 dated Oct. 4, 2012.

* cited by examiner

CARTRIDGE, METHOD OF MANUFACTURING SAME AND MULTICOMPONENT CARTRIDGE

PRIORITY CLAIM

The present application is a National Stage of International Application No. PCT/EP2012/066190, filed on Aug. 20, 2011, which claims priority to European Patent Application No. 11185380.0 filed on Oct. 17, 2011, the entire contents of which are being incorporated herein by reference.

The invention relates to a cartridge having at least one reception chamber, which extends in the longitudinal direction, for a medium to be dispensed, to a method for its manufacture as well as to a multicomponent cartridge in accordance with the preamble of the respective independent claim.

In the industrial sector, in the construction industry, for example of buildings, and also in the dental sector, cartridges are frequently used to store liquid or flowable substances, frequently pasty or viscous to highly viscous substances, and to dispense them for the respective application as required. Examples for such substances are caulking compounds, materials for chemical dowels or chemical anchors, adhesives, pastes or impression materials in the dental sector. These cartridges are usually produced from plastic and are manufactured in an injection molding process.

A distinction is made between single-component systems in which the material to be dispensed is only made of one component and two-component or multicomponent systems in which at least two different components are stored in separate chambers of the same cartridge or in separate cartridges, wherein the components are intimately mixed, for example, on dispensing by means of a dynamic or static mixing apparatus. Examples for this are two-component adhesives or chemical dowels which only harden after the mixing of the two components. Two-component systems are in particular also used in the industrial sector for paints which are often used to generate functional protective layers such as for corrosion protection.

It is usually the case that the cartridges include one or more axially displaceable conveying pistons by whose movement the material is dispensed from the chamber or chambers. It is understood that for this purpose the chambers have to have sufficiently thick walls in order to be able to withstand the pressure arising on the dispensing. In addition, the cartridges have to have sufficiently substantial wall thicknesses to be sufficiently diffusion-resistant. This is in particular important with respect to the storage to prevent a diffusing in or a diffusing out of the chemical substances and thus a degradation of the cartridge content as effectively as possible. Since such plastic cartridges are as a rule only designed for a single use, a substantial amount of waste results both with regard to volume and to mass, which is in particular also disadvantageous under aspects of environmental protection.

In addition to the aspect of environmental protection, the topic of sustainability is also increasingly gaining importance. The use of renewable starting materials, the minimization of the use of raw materials as well as a reduction of waste which is as high as possible are increasingly gaining importance both with regard to the cartridge per se and to the volume of residual mass remaining in the cartridge.

It is therefore an object of the invention to provide a cartridge which represents an improvement, in particular also with respect to its waste volume and its waste amount, with regard to sustainability and environmental protection. A high operational security and a good storability of the cartridge should be ensured in this respect. A method of manufacturing such a cartridge should furthermore be provided by the invention. Furthermore, a corresponding multicomponent cartridge should be made possible by the invention.

The subjects of the invention satisfying this object are characterized by the features of the independent claims of the respective category.

In accordance with the invention, a cartridge is therefore provided having at least one reception chamber, which extends in the longitudinal direction, for a medium to be dispensed, having an end face and a cartridge wall which bound the reception chamber and which are injection molded in one piece, with the end face having an outlet for the medium, and with the cartridge wall having a first film at its inner side bounding the reception chamber which extends over the total cartridge wall and is non-releasably connected to the cartridge wall.

A very efficient diffusion barrier is realized by the film which is inwardly provided at the cartridge wall and which is non-releasably connected to the cartridge wall so that the wall thickness of the cartridge can be considerably reduced with respect to cartridge systems known today without concessions on the storability or the maximum storage time being necessary. The cartridge contents are even effectively protected against the diffusing in or out of substances or a "degassing" with longer storage times. A considerably reduced wall thickness, however, means a substantially smaller raw material requirement as well as a noticeable reduction of the waste amount. A further positive aspect is that the cartridge wall can be protected by the film, e.g. when the material of the cartridge wall is sensitive to the medium in the reception chamber. It is furthermore possible to use a less expensive material or a more environmentally friendly material for the cartridge because the cartridge wall is protected from the medium by the film and no longer necessarily has to be insensitive to the medium. Biopolymers can in particular also be used for the manufacture of the cartridge. The cartridge is preferably placed into a reusable supporting cartridge on the dispensing of its contents so that the cartridge wall withstands the mechanical strains on dispensing.

The end face preferably has a second film on its surface facing the reception chamber which extends over the total end face and is non-releasably connected to the end face. The cartridge contents are also protected against diffusion processes through the end face by this measure.

In a preferred embodiment, a piston is furthermore provided which can be introduced into the reception chamber at the end remote from the end face and is sealingly displaceable along the cartridge wall in the longitudinal direction. The use of a piston in the reception chamber for dispensing the medium has the advantage that as a rule smaller residual material volumes remain in the cartridge, whereby the amount of waste is reduced. Furthermore, with chemical media in the reception chamber, the risks caused by chemistry are minimized.

An advantageous measure is that the piston has a third film on its surface facing the reception chamber. In combination with the film on the end face, the medium in the cartridge is then completely surrounded by film, i.e. completely packed in film.

In accordance with a preferred embodiment, the cartridge wall has a wall thickness of at most 2 mm, preferably at most 1.5 mm and in particular at most 0.8 mm. The thinner the cartridge wall is in design, the smaller the raw material requirements for the manufacture of the cartridge and the waste amount after the emptying of the cartridge.

It has proved itself in practice when the first film or the second film or the third film has a thickness of at most 0.2 mm, preferably of approximately 0.1 mm.

In a preferred embodiment, connection means are provided at the cartridge by means of which the cartridge can be connected to a second cartridge. These connection means can in particular be designed as a latch connection or a click connection or snap-in connection. The connection means are preferably arranged so that the two cartridges can be connected side by side next to one another so that their longitudinal directions or longitudinal axes extend parallel to one another. The possibility of connecting a plurality of cartridges to one another via the connection means considerably increases the flexibility with respect to the areas of application because the cartridges can in particular be used very easily for multicomponent systems.

It is in particular advantageous when the first film or the second film or the third film is designed as a multilayer system. It is namely hereby possible to adapt the films ideally to the respective application. The properties of the films serving as a barrier can be used in a targeted manner to make them as efficient as possible with respect to the medium in the reception chamber. Such a multilayer system is preferably designed as a composite film. The multilayer system can also include metallic layers.

A method is furthermore provided by the invention for manufacturing a cartridge in accordance with the invention in which a core is provided in a tool of an injection molding apparatus which is shaping for the reception chamber of the cartridge, with a film being applied to the jacket surface of the core which is subsequently overmolded with a liquid plastic. It is possible by this overmolding easily to partially melt or plasticize the film so that it subsequently enters into an intimate, non-releasable connection with the cartridge wall on the cooling and solidifying of the plastic.

A preferred method management is that a second film is applied to the end face of the core before the liquid plastic is introduced into the tool. The second film which is arranged on the end side of the cartridge can then be realized in the cartridge by this film. On the manufacture of the cartridge, this film is preferably dimensioned so that it has an excess dimension with respect to the end face of the core onto which it is placed, i.e. it projects beyond the margin of the end face. On the injection molding, the part of the film projecting beyond the margin is then bent over by the liquid plastic so that it is sealingly connected to the film arranged on the jacket surface of the core.

A multicomponent cartridge is furthermore provided by the invention having at least two cartridges in accordance with the invention, wherein the two cartridges are arranged next to one another with respect to the longitudinal direction or wherein the two cartridges are arranged in one another, preferably coaxially in on another, so that the one cartridge surrounds the other cartridge. In the first variant, it is a question of so-called side-by-side cartridges in which the two reception chambers are arranged next to one another. In the second variant, the two cartridges are arranged in one another so that the cartridge wall of the outer cartridge completely surrounds the cartridge wall of the inner cartridge. In this respect, the inner cartridge is preferably centered in the outer cartridge so that their longitudinal axes coincide. Coaxial cartridges are then spoken of. The area of application of the cartridge in accordance with the invention can be expanded to include two-component and multicomponent systems by this multicomponent cartridge.

The two cartridges are preferably fixedly connected to one another via the connection means so that the multicomponent cartridge forms a unit capable of storage and dispensing.

It is a particularly advantageous measure if the outlets of the cartridges form a common connection piece which is designed for cooperation with an accessory part, is in particular equipped with a closure part or with a mixer. It is, for example, possible in this manner to use accessory parts known per se in conjunction with the multicomponent cartridge. This compatibility is advantageous for practical and economic reasons.

To protect the contents of the dispensing chambers during the storage, it is advantageous if the multicomponent cartridge has a closure part which is designed for cooperation with the connection piece and has two plugs of which each can engage into an outlet to close it.

To increase the flexibility of the multicomponent cartridge with respect to the areas of use and the applications, the reception chambers of the two cartridges can have different volumes so that in particular mixing ratios between the two media contained in the reception chambers of the cartridges can be realized which differ from a ratio of 1:1.

Further advantageous measures and embodiments of the invention in an apparatus aspect and in a technical method aspect result from the dependent claims.

The invention will be explained in more detail in the following with reference to embodiments and to the drawing. There are shown in the schematic drawing, partly in section.

Figure 1:
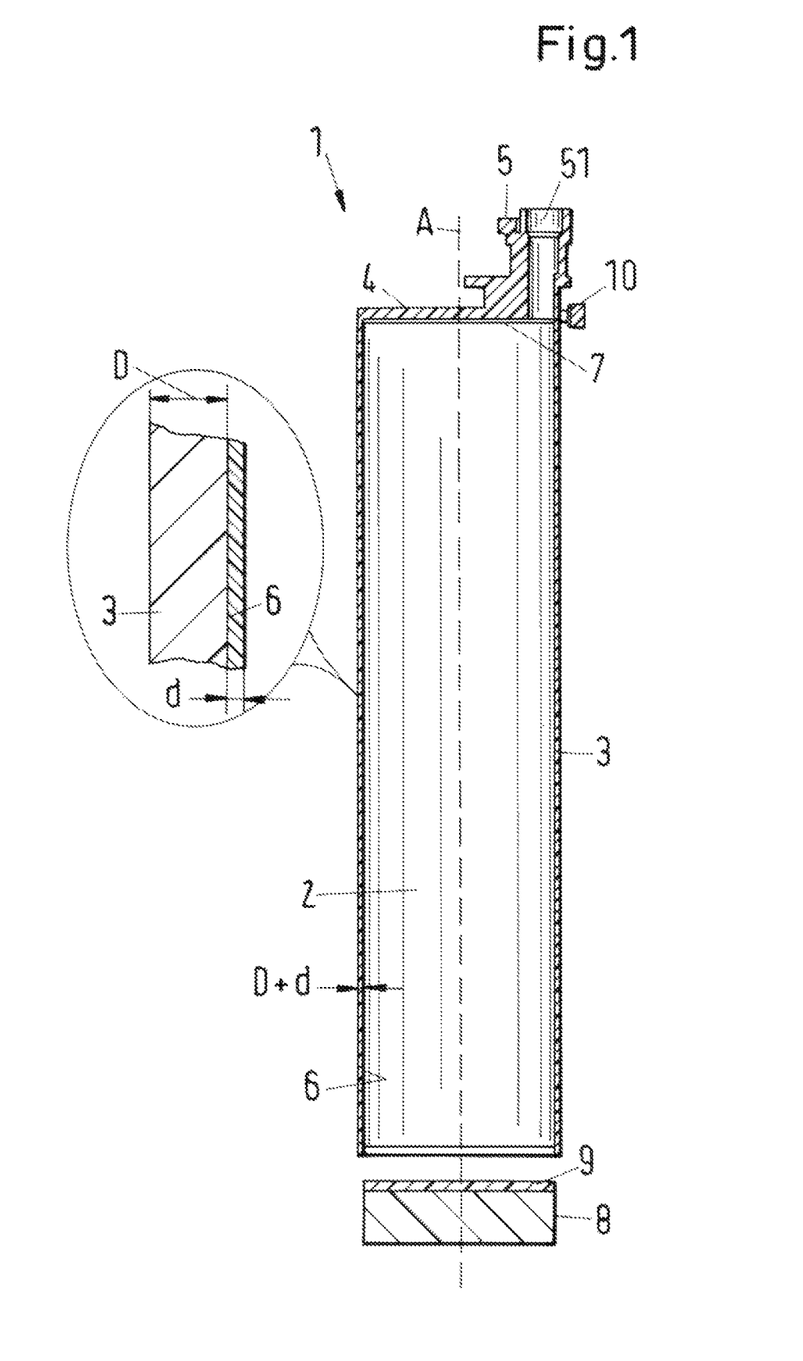
FIG. 1: an embodiment of a cartridge in accordance with the invention in a longitudinal section as well as an enlarged detail of the cartridge wall.

FIG. 1 shows in a longitudinal section an embodiment of a cartridge in accordance with the invention which is designated as a whole by the reference numeral 1. The cartridge 1 includes a reception chamber 2, which extends in the longitudinal direction, for a medium to be dispensed.

The longitudinal direction is defined by the longitudinal axis of the cartridge 1 designated by A. The reception chamber 2 is bounded by a cartridge wall 3 as well as by an end face 4. The reception chamber 2 of the cartridge 1 is cylindrical in design, that is the cartridge wall 3 is the jacket surface of a cylinder. In addition, FIG. 1 shows an enlarged detail of the cartridge wall 3.

The end face 4 of the cartridge 1 has an outlet 5 having an outlet passage 51 for the medium through which the medium can be dispensed from the reception chamber 2. The cartridge wall 3 and the end face 4 having the outlet 5 are injection molded in one piece, that is they are manufactured entirely in a single injection molding process, usually a one-step injection molding process. It is therefore not a case of such cartridges which are made, for example, of two half-cylinders which are subsequently welded to one another.

In accordance with the invention, the cartridge wall 3 has a first film 6 at its inner wall bounding the reception chamber 2 as in particular the detail representation in FIG. 1 shows. The first film 6 extends over the total cartridge wall 3, that is over the total inner side of the cylinder jacket which bounds the reception chamber 2. The film 6 is non-releasably connected to the cartridge wall 3 and is preferably connected to the cartridge wall 3 in an injection molding process, as will be explained further below.

In the embodiment described here, the end face 4 has a second film 7 on its surface facing the reception chamber 2 which extends over the total end face 4 and is non-releasably connected to the end face 4, preferably in accordingly the same manner as the first film 6. The second film 7 is of circular disk shape and also extends over the opening of the outlet passage 51 into the reception chamber 2. The outlet passage 51 is consequently closed by the second film 7 at its opening into the reception chamber 2.

The cartridge 1 furthermore has connection means 10 by means of which the cartridge 1 can be connected to a second cartridge 1. In the embodiment described here, the connection means 10 are provided next to the outlet 5 at the end face 4 of the cartridge 1. The connection means 10 are preferably designed in a manner known per se as a click connection or as a snap-in connection or as a latching connection and are arranged so that two cartridges 1 are arranged side by side, that is with parallel longitudinal axes A next to one another (see e.g. FIG. 3). Alternatively or additionally, connection means can naturally also be arranged along the cartridge wall 3.

The cartridge 1 or the reception chamber 2 is open at the end remote from the end face 4. A piston 8 is provided which is preferably designed as a valve piston or as a self-bleeding piston and which can be introduced into the reception chamber 2 at the open end of the cartridge 1 remote form the end face 4. The piston 8 is designed and dimensioned so that it is sealingly displaceable in the longitudinal direction along the cartridge wall 3. For this purpose, the piston 8 can be designed in a manner known per se with sealing lips or sealing margins, not shown, which contact the cartridge wall 3 when the piston 8 is introduced into the reception chamber 2.

The piston 8 is manufactured separately from the cartridge 1, for example in an injection molding process and is usually only inserted after the filling of the reception chamber 2.

An advantageous measure is that the piston has a third film 9 at its surface facing the reception chamber, that is at that surface which bounds the reception chamber 2 after the insertion of the piston 8.

The first film 6 provided in accordance with the invention and the optionally provided second and third films 7 and 9 serve as a barrier or as a diffusion barrier which prevents the diffusing in or diffusing out of substances. The substances can, for example, be chemical components of the medium contained in the reception chamber 2 or can be moisture or oxygen. The film 6 and optionally the films 7 and 9 thus allow a particularly long storability of the cartridge 1 filled with a medium. Since the first film 6 acts as a barrier layer or as a diffusion barrier, it is possible to design the cartridge wall 3 with a thickness D which is much smaller than with known cartridges since in the cartridges known from the prior art a larger wall thickness has to be provided so that the cartridge is sufficiently diffusion-resistant or is protected against degassing. It is possible due to the first film 6 to manufacture the cartridge wall 3 with a thickness D of at most 2 mm, preferably at most 1.5 mm and specifically of at most 0.8 mm. In this respect, the lower limit of 0.8 mm is primarily caused by the ratio which can be realized with injection molding processes known today of injection length or injection path for the plastic and the thickness of the plastic layer. The greatly reduced thickness D of the cartridge wall 2 in comparison with known cartridges has the advantageous effect that considerably less raw material is required for the manufacture of the cartridge 1 and that the amount of waste of the cartridge 1 usually designed for single use is considerably reduced with respect both to the volume and to the weight.

The second advantageous effect of the first film 6 is that it reduces the friction between the piston 8 and the cartridge wall 3. The piston 8 is moved in the direction of the longitudinal axis A during the use for dispensing the medium from the reception chamber 2 to convey the medium through the outlet passage 51. The first film 6 in this respect enables an easier sliding of the piston 8 along the cartridge wall 3.

The second film 7 and the third film 9 respectively have the advantage that the total reception space 2 of the cartridge 1 is surrounded by a barrier layer or a diffusion barrier by them; that is, the medium in the reception chamber 2 is completely surrounded by the films 6, 7, 9 or is enclosed by them, which is advantageous with respect to a particularly good storability. The three films 6, 7, 9 can be—but do not have to be—designed as of the same type with respect to their thickness D and their composition. It is preferred for practical reasons if the films 6,7,9, each have a thickness of at most 0.2 mm, and preferably of approximately 0.1 mm.

Each of the films 6, 7, 9 can be ideally adapted to the respective application. Depending on the composition and on the type of the medium in the reception chamber 2, the films 6,7,9, can be designed so that they ensure an ideal storability and an ideal protection of the cartridge wall 3 and of the end face 4. It is hereby also possible to use a plastic for the cartridge 1 which is sensitive to the medium in the reception chamber 2 or would be attached by this medium. The medium in the reception chamber 2 namely does not even come into contact with the cartridge wall 3 or the end face 4 due to the films 6, 7. It hereby becomes possible to use a particularly inexpensive material or a particularly environmentally friendly material for the manufacture of the cartridge. Biopolymers are therefore also in particular suitable for the manufacture of the cartridge 1.

It is a particularly preferred measure if in particular the first film 6, the second film 7 or the third film 9 is designed as a multilayer system, that is, for example, is formed from a plurality of films or layers placed over one another. These different layers of the film 6,7,9 can have different functions. A protective layer which is made of a plastic not sensitive to the medium to be dispensed, for example polyamide (PA) or polybutylene terephthalate (PBT) can, for example, be on the side facing the reception chamber 2. This can optionally be adjoined by a barrier layer which prevents the exit or entrance of substances such as water, oxygen or VOCs (volatile organic compounds). A filler layer, which is made e.g. of recyclate, can then follow. Layers of a polyolefin such as PE or PP can also be provided, or metallic layers.

Additionally or alternatively, foamed films can also be provided as layers.

Figure 2:
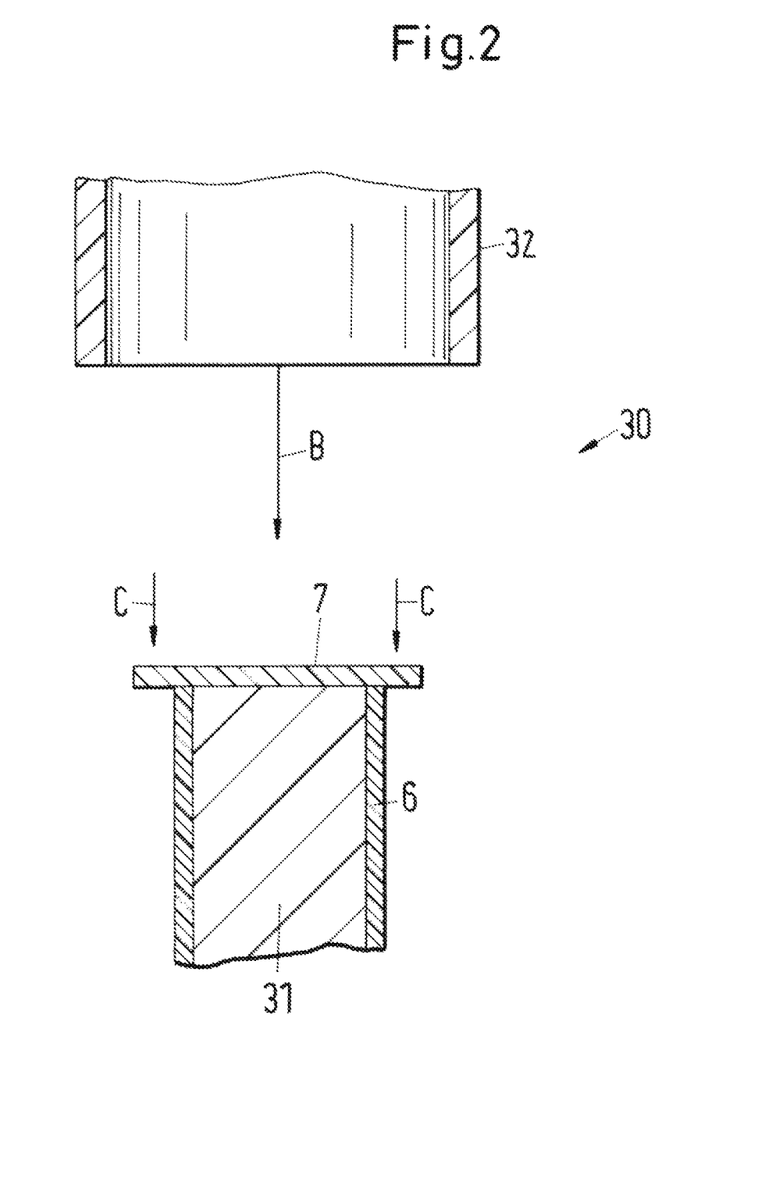
FIG. 2: a schematic representation for explaining an embodiment of the method in accordance with the invention.

The cartridge in accordance with the invention is manufactured in an injection molding process. An embodiment of a method which is suitable for manufacturing the cartridge 1 will now be explained with reference to FIG. 2. As generally usual, a tool 30 is used in injection molding which includes cores and hollow spaces into which the liquid plastic is injected. In FIG. 2, only one such core 31 is shown, namely that core which is shaping for the reception chamber 2 of the cartridge 1. On the closing of the tool 30, the core 31 moves into a correspondingly shaped counter-piece 32 such as the arrow B in FIG. 2 symbolically indicates. Either the core 31 or the counter-piece 32 or both can be moved for this purpose. After the closing of the tool 30, there is then a hollow space between the core 31 and the counter-piece 32 which is a negative mold of the cartridge wall 3 and of the end face 4. The liquid plastic is injected into this hollow space as is indicated by the two arrows having the reference symbol C and solidifies there. The tool 30 is subsequently opened and the cartridge 1 is demolded and expelled.

In accordance with the invention, a film which forms the first film 6 in the finished cartridge 1 is applied to the jacket surface of the core 31 before the injection molding of the cartridge 1.

After the closing of the tool 30, the film 6 is partially overmolded with the liquid plastic. In so doing, the film 6 easily partially melts or is plasticized due to the contact with the liquid plastic. A particularly intimate and non-releasable connection hereby arises between the cartridge wall 3 and the film 6.

In the embodiment of the method in accordance with the invention described here, the preferred embodiment of the cartridge 1 is manufactured in which the end face 4 of the cartridge is provided with the second film 7. For this purpose, a film of circular disk shape which then forms the second film 7 in the finished cartridge is placed onto the end face of the core 31 before the injection molding. The film of circular disk shape is in this respect preferably dimensioned such that it projects over the margin of the end face of the core 31 as shown in FIG. 2. If the liquid plastic is then injected after the closing of the tool 30 (arrows C), it bends that part of the film of circular disk shape which projects over the margin of the end face of the core 31, downwardly in accordance with the representation. The film 7 of circular disk shape is hereby intimately connected to the film 6 or is pressed firmly on so that a tight, and optionally fixed, connection is present between the first film 6 and the second film 7 respectively in the finished cartridge 1.

It is naturally important that the films 6 and 7 adhere to the core 31 for so long until they are overmolded with plastic. This adhesion can be realized in different manners, for example electrostatically or by generating an underpressure by corresponding suction openings in the core 31.

All plastics known per se used for cartridges, for example, polyamides (PA), polypropylene (PP), polyethylene (PE), polybutylene terepththalate (PBT) or polyolefins in general, are suitable for the manufacture of the cartridge. Biopolymers are also suitable for the cartridge in accordance with the invention in particular due to the use of films 6 and 7.

The cartridge 1 is first manufactured without the piston 8 in an injection molding process and is then closed at its outlet 5. The medium is filled into the reception chamber 2 from the still open end of the reception chamber 2 at the bottom in accordance with the representation. Subsequently, the piston 8, which is optionally provided with the third film 9, is inserted into the reception chamber 2 and then forms the chamber base which sealingly closes the reception chamber 2. The piston 8 is frequently designed as a valve piston so that, on the insertion of the piston 8, the air which may be present between the medium and the piston can be removed in a simple manner.

Figure 3:
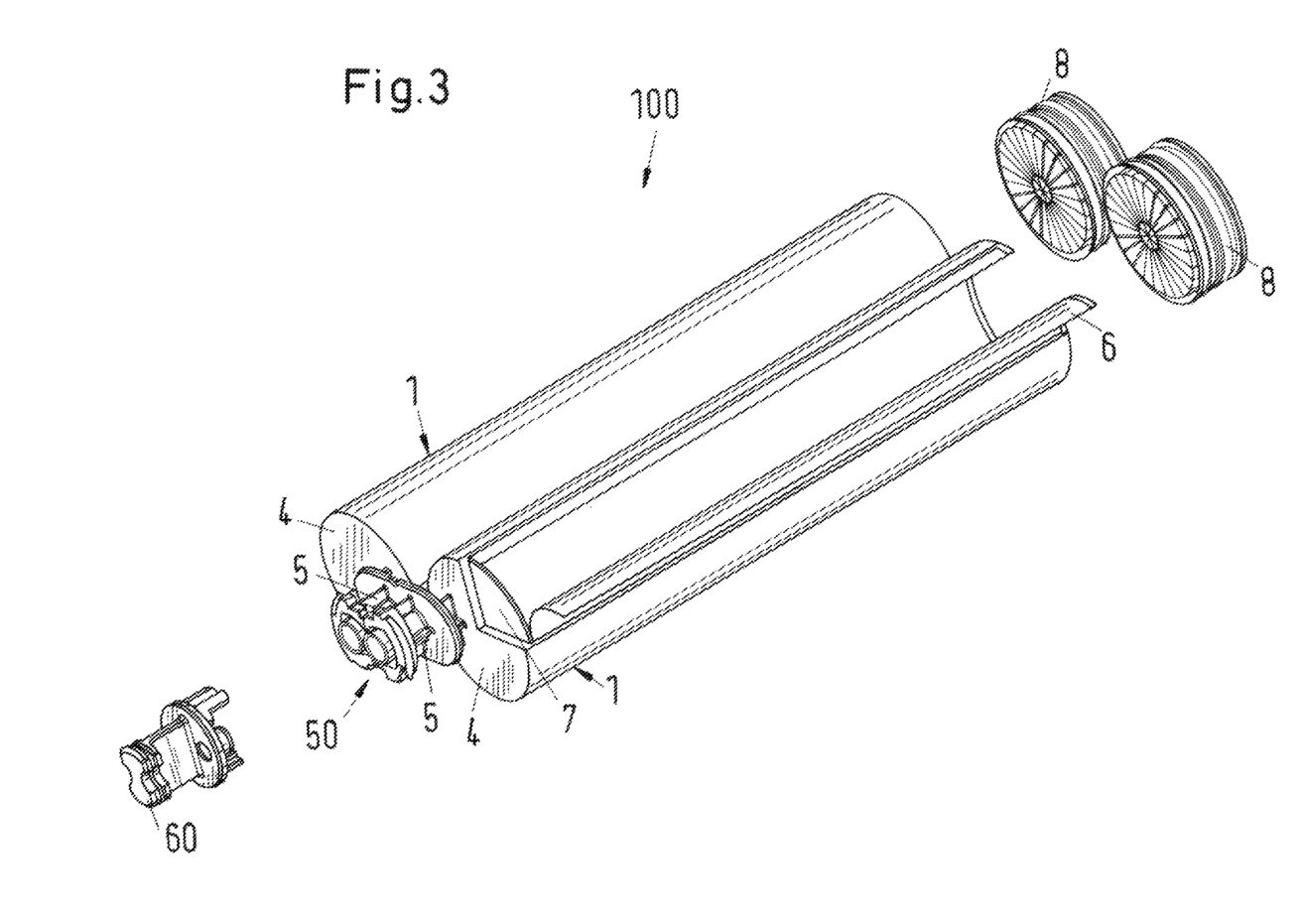
FIG. 3: a perspective representation of a first embodiment of a multicomponent cartridge in accordance with the invention.

FIG. 3 shows a perspective representation of a first embodiment of a multicomponent cartridge in accordance with the invention which is designated as a whole by the reference numeral 100. The multicomponent cartridge includes at least two cartridges 1 of which each is designed in accordance with the invention.

In the following, reference will be made with an exemplary character to the case of special importance for practice that the multicomponent cartridge 100 is a two-component cartridge which includes exactly two cartridges 1. It is, however, understood that the invention is not restricted to such cases, but that the multicomponent cartridge can also include three or more cartridges.

The two cartridges 1 of the multicomponent cartridge 100 are arranged side by side next to one another so that their longitudinal axes A (see FIG. 1) extend parallel to one another. The one of the two cartridges 1 is shown so that a quarter of its end face is removed and a quarter of the cartridge wall 3 is removed for better understanding.

The two cartridges 1 are preferably fixedly connected to one another via the connection means 10. It is, however, also possible that the two cartridges 1 are manufactured in a common injection molding process and are then fixedly connected to one another via elements not releasable without destruction so that the two-component cartridge is in one piece with respect to the cartridge walls and end faces. For example, bars can be provided along the cartridge walls or between the end faces which connect the two cartridges 1 to one another. It is furthermore possible that the two cartridges 1 are connected to one another via a common base at the end of the reception chamber 2 remote from the end face 4.

A respective piston 8 is provided for each of the two cartridges 1 and is introduced into the reception chamber 2 after the filling of the respective reception chamber. The two outlets 5 of the cartridges 1 are arranged and designed such that they form a common connection piece 50 which includes the two separate outlets 5 and which is designed for cooperating with an accessory part. A closure part 60 which is designed for cooperating with the connection piece 50 and which can close the two outlets 5 is provided as an accessory part in FIG. 3.

Figure 4:
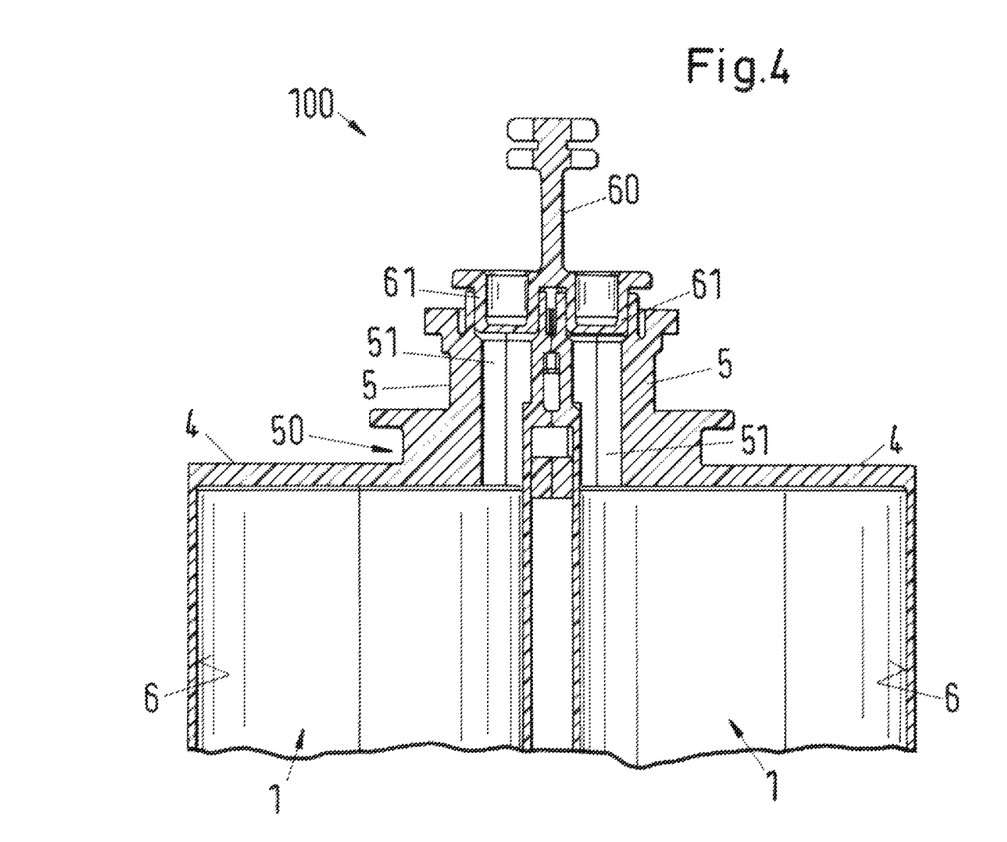
FIG. 4: a representation of the outlets with an inserted closure part.

FIG. 4 shows the connection piece 50 with the two outlets 5 in a larger representation. In FIG. 4, the closure part 60 is in operative connection with the connection piece 50. It can be recognized that the closure part 60 has two plugs 61 of which each engages into an outlet passage 51 of the outlets to close it sealingly. The closure part 60 can thus be designed so that it is only connected to the connection piece 50 via the introduction of the plugs 61 into the outlet passages 51. Securing means (not shown) can be provided to avoid an unintentional removal of the closure part 60, for example desired breaking points which are broken open or broken through by kinking off, turning or similar measures before the removal of the closure part. The securing means can also be designed as latching connections or snap-in connections. It is furthermore possible that the closure 60 can be coupled to the connection piece 50 via a thread connection or a bayonet connection.

Figure 5:
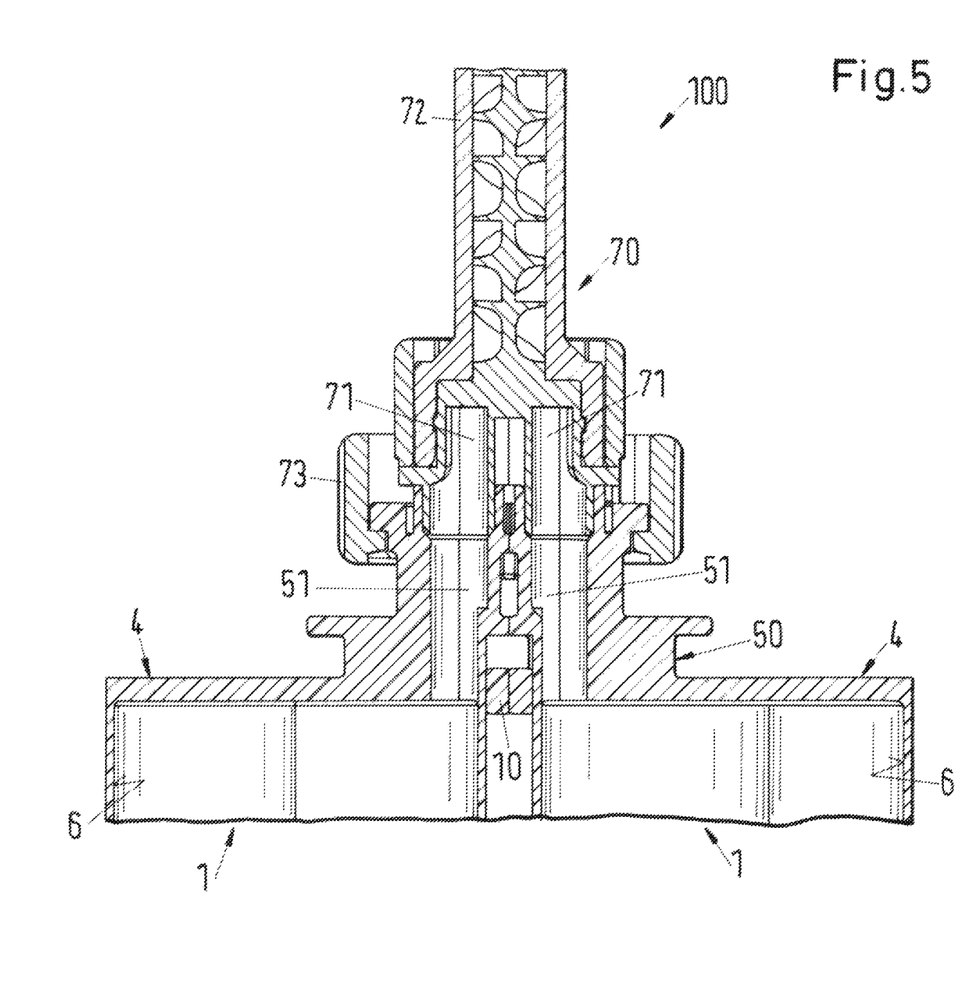
FIG. 5: a representation of the outlets with a mixer placed on (only shown in part)

FIG. 5 shows the connection piece 50 or the outlets 5 with an accessory part, namely with a mixer 70. In this respect, it is a static mixer 70 for mixing the two media which are present in the respective reception chambers 2 of the two cartridges 1. The static mixer 70 includes in a manner known per se a mixer tube 72, only indicated in FIG. 5, with mixing elements (not shown) arranged therein. The mixer 70 furthermore includes two inlets 71 as well as one coupling piece 73. If the mixer 70 is placed onto the multicomponent cartridge 100, each of the separate inlets 71 engages into or over one of the outlet passages 51 so that the inlets 71 each form a flow connection with one of the outlets 5 and the respective medium moves from the respective reception chamber 2 through the respective outlet 5 into the mixer 70. The two media meet one another here and are mixed intimately with one another on passing through the mixer 70.

All types of connection known per se, in particular screw connections or bayonet connections, are suitable for the connection of the mixer 70 to the connection piece 50 via the coupling piece 73.

If the cartridges 1 are provided with the second film 7 at their end face 4, it must be pierced or cut before the dispensing of the media. A number of possibilities are known to the skilled person for this purpose. A variant is that the inlets 71 of the mixer—or corresponding parts of another accessory part—are designed at their ends cooperating with the outlets 5, for example with an oblique edge or a mandrel, such that the inlets 71 pierce the film 7 or open it in another manner on the placing on of the mixer 70.

Figure 6:
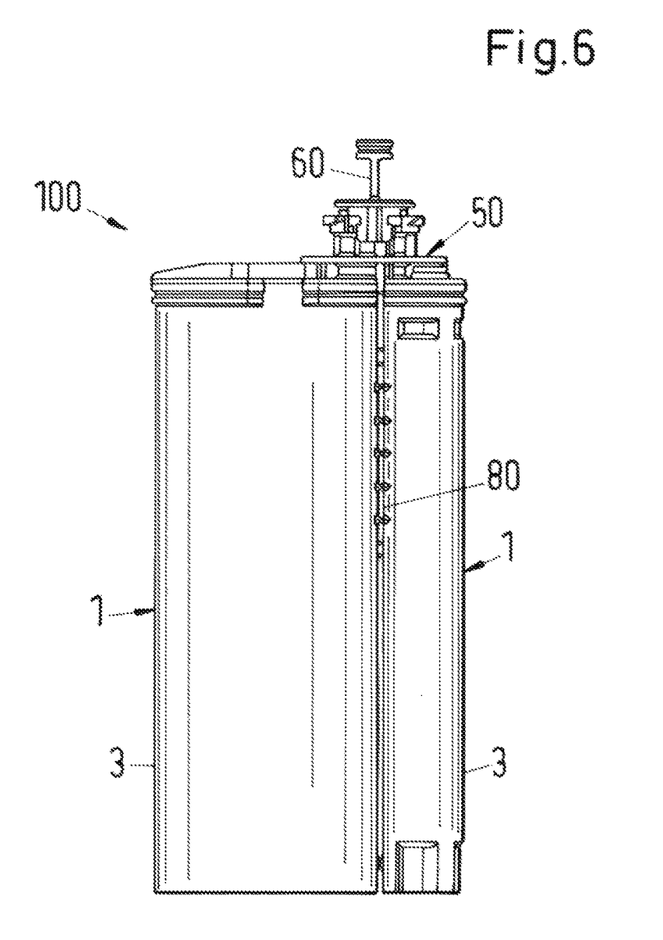
FIG. 6: a view of a second embodiment of a multicomponent cartridge in accordance with the invention.

FIG. 6 shows the view of a second embodiment of a multicomponent cartridge 100 in accordance with the invention. Only the differences from the first embodiment will be looked at in more detail in the following. The explanations which were made with respect to the first embodiment also apply in correspondingly the same manner to the second embodiment.

In the second embodiment, the multicomponent cartridge includes two cartridges 1, with the reception chambers 2 of the two cartridges 1 having different volumes. Such multicomponent cartridges 100 are intended for such two-component systems in which the two components should be mixed with one another in a volume ratio different from 1:1. In the multicomponent cartridge 100 shown in FIG. 6, the cartridge 1 at the left in accordance with the illustration has ten times the volume as the cartridge 1 at the right in accordance with the illustration. Other ratios are naturally also realizable, for example 2:1 or 4:1.

In the multicomponent cartridge 100 shown in FIG. 6, further connection means 80 are furthermore provided between the two cartridges 1 which are here formed as a plurality of bars of which each extends between the adjacent cartridge walls 3 of the cartridges 1.

As already mentioned, the two-component or multicomponent cartridge 100 is preferably composed of two individual cartridges 1 or is manufactured in a single-stage injection molding process in which both cartridges are injection molded together and then preferably as a unit. The outlets 5 are closed by the closure part 60 before the filling of the cartridges 1. The respective media or components are then filled into the reception chambers 2 from the still open ends of the reception chambers remote from the end faces 4. Subsequently, a respective piston 8, optionally respectively provided with the third film 9, is inserted into the reception chambers 2 and then forms the respective chamber base and sealingly closes the reception chambers 2. The pistons 8 are frequently designed as valve pistons so that the air present between the piston 8 and the medium can be let off on the introduction of the pistons 8. Once the multicomponent cartridge 100 has been filled, it can be stored, wherein the first film 6 and the optionally provided second and third films 7, 9 protect the cartridge contents from degassing or from other diffusion induced influences.

Figure 7:
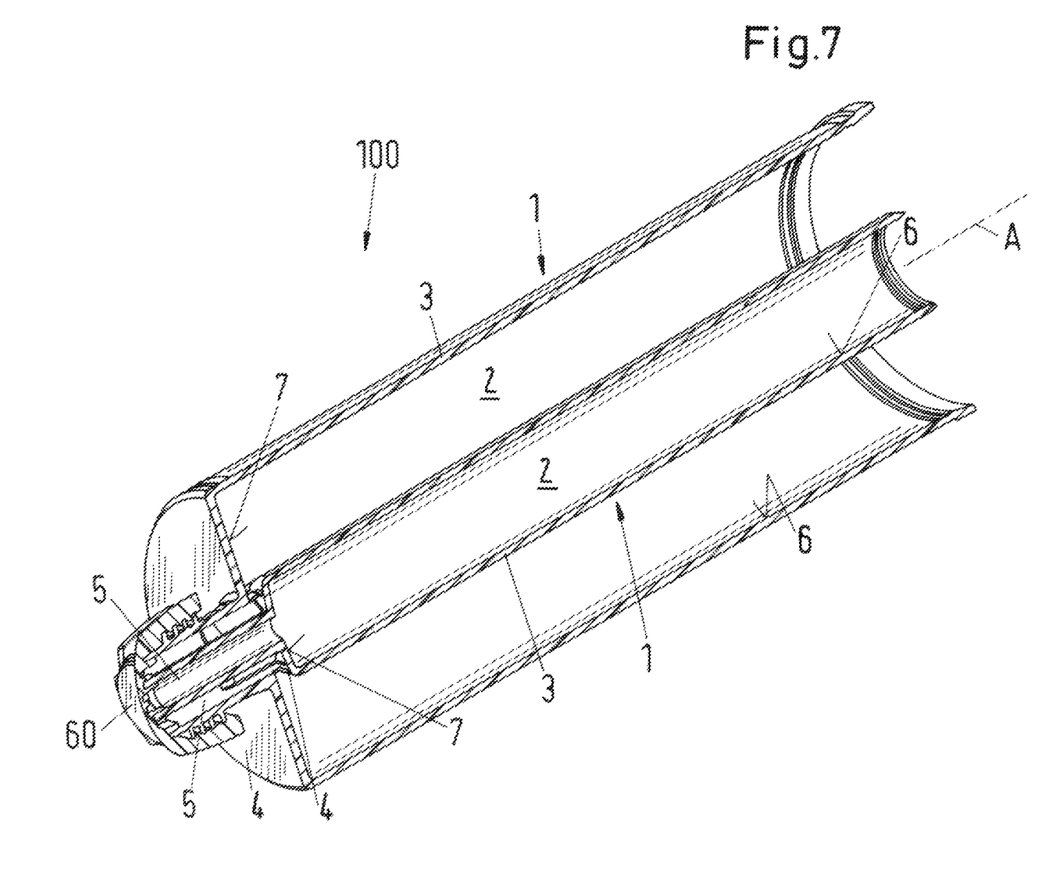
FIG. 7: a view of a third embodiment of a multicomponent cartridge in accordance with the invention.

FIG. 7 shows a perspective longitudinal sectional representation of a third embodiment of a multicomponent cartridge 100 in accordance with the invention. Only the differences from the first and second embodiments will be looked at in more detail in the following. The explanations which were made with respect to the first and second embodiments also apply in correspondingly the same manner to the third embodiment. In the third embodiment, the two cartridges 1 are arranged in one another so that the cartridge wall 3 of the outer cartridge 1 in accordance with the representation completely surrounds the cartridge wall 3 of the inner cartridge 1 in accordance with the representation. In this respect, the inner cartridge is preferably centered in the outer cartridge so that their longitudinal axes A coincide. This means that in a section through the two reception chambers 2 perpendicular to the common longitudinal axis A, the two cartridge walls 3 of the inner and outer cartridges 1 form concentric circles around the longitudinal axis A. Such multicomponent cartridges 100 are usually called coaxial cartridges and are sufficiently known per se to the skilled person so that they do not require any further explanation. In accordance with the invention, each of the two cartridges 1, namely both the inner and the outer cartridge 1 each have a cartridge wall 3 which has at its inner side bounding the respective reception chamber 2 the first film 6 which respectively extends over the total cartridge wall 3. Optionally, the respective second film 7 can also be provided at each end surface 4 here. The two pistons 8, which can each optionally be provided with the third film 9, are not shown in FIG. 7. The piston 8 belonging to the outer cartridge 1 in accordance with the representation is in this respect designed in a manner known per se as a ring piston. The multicomponent cartridge 100 designed as a coaxial cartridge can be manufactured either in a single injection molding process or the two cartridges 1 are first each manufactured separately in an injection molding process and subsequently connected.

The use of the two-component or multicomponent cartridge 100 will now be explained with reference to FIGS. 8 and 9. To use the two-component cartridge 100, it is usually inserted into the holder of a dispensing apparatus (dispenser) 200. Since the multicomponent cartridge 100 is usually designed with thin cartridge walls 3 due to the first film 6, a supporting cartridge 90 is preferably used for the dispensing so that the multicomponent cartridge can withstand the mechanical strain on dispensing, in particular the pressure strain. The support cartridge 90 is designed for multiple use; it can be reused as often as desired. It is naturally also alternatively possible not to realize the supporting function by a separate supporting cartridge, but rather to realize the supporting function in the holder of the dispensing apparatus.

Figure 8:
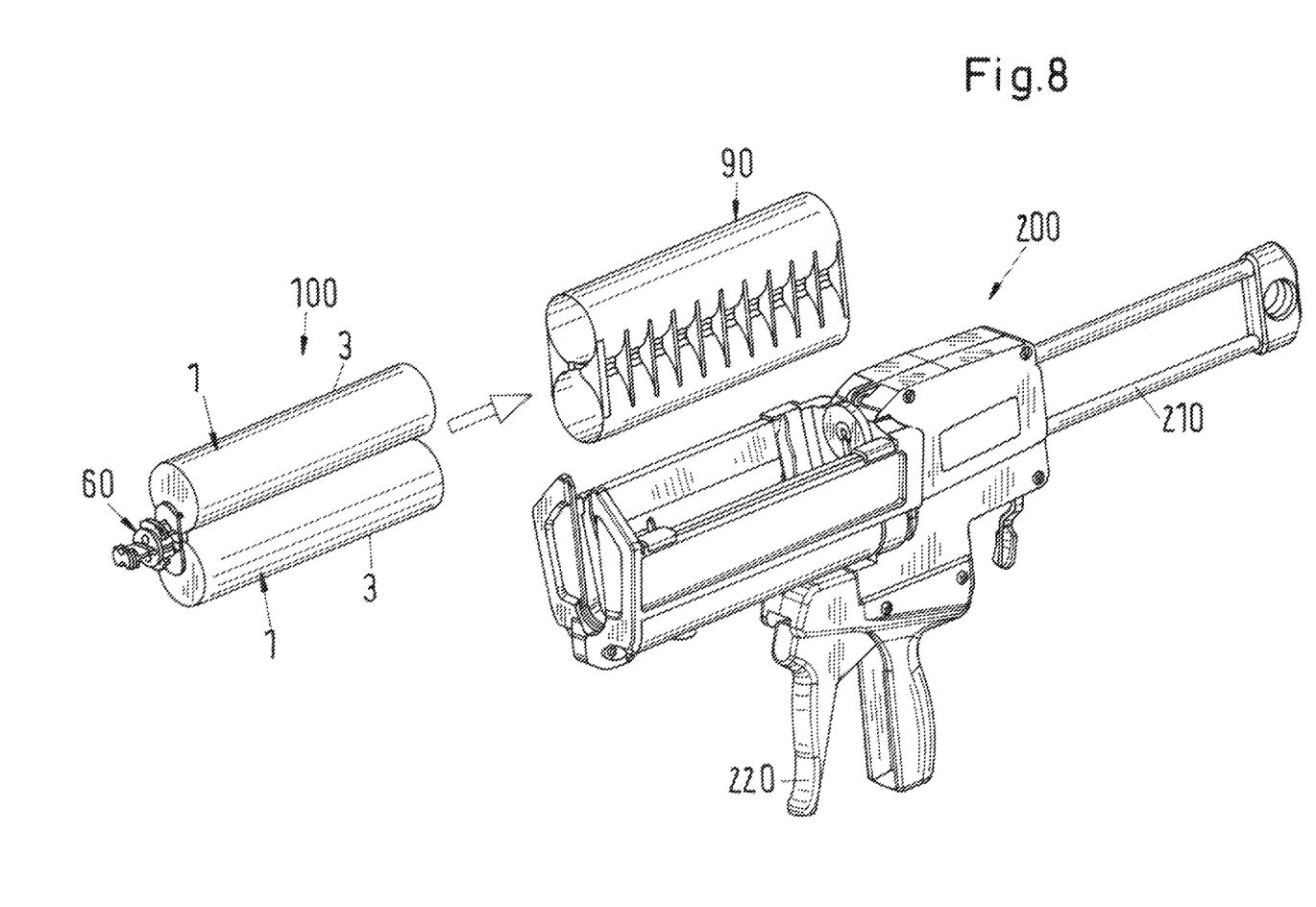
FIGS. 8-9: representations of a dispensing apparatus which is suitable for the cartridge in accordance with the invention and for the multicomponent cartridge in accordance with the invention.
Figure 9:
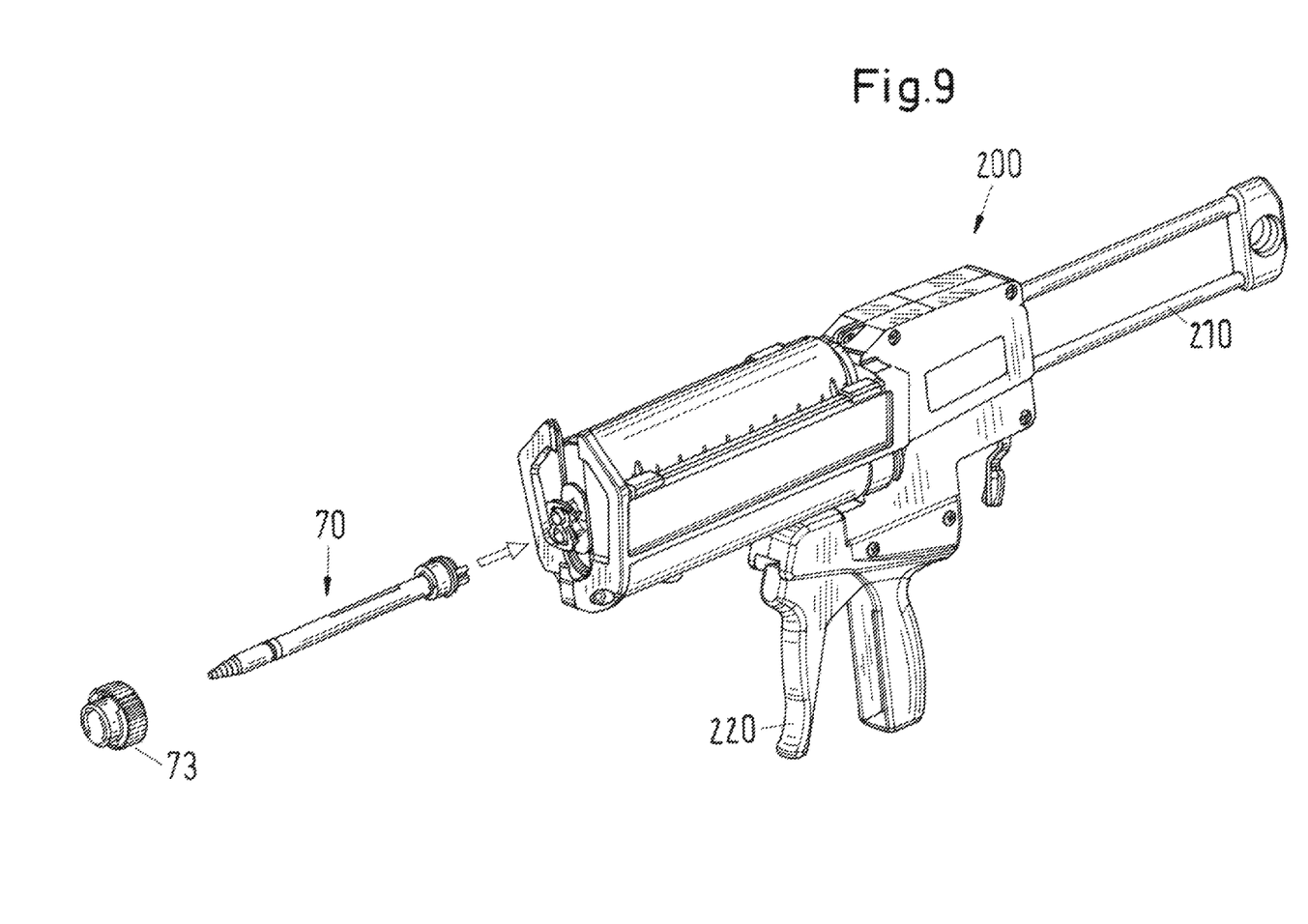

As is indicated by the arrow without reference symbol in FIG. 8, the multicomponent cartridge 100 is first introduced into the supporting cartridge 90 and is then inserted into the holder of the dispensing apparatus 200 together with it. The closure part 60 is removed and a mixer 70 is fastened in its stead to the connection piece 50 (FIG. 9) by means of its connection piece 73, with a bayonet connection here. The dispensing apparatus 200 includes a double plunger 210 which can be moved forward by means of an activator 220. The double plunger 210 then exerts a force onto the two pistons 8 in the reception chambers 2, whereby they are displaced along the longitudinal axes A of the cartridges 1 and convey the respective medium through the respective outlet 5 into the static mixer 70. The two media (components) meet one another here and are mixed intimately with one another on passing through the mixer.

The invention claimed is:

1. A cartridge comprising:
    at least one reception chamber extending in a longitudinal direction for a medium to be dispensed, the at least one reception chamber having
    an end face and a cartridge wall bounding the reception chamber, the end face and the cartridge wall being injection molded in one piece,
    the end face having an outlet for the medium,
    the cartridge wall having a first film, the first film forming an inner cartridge wall and being an innermost cartridge surface extending over a total length of the cartridge wall up to the end face, and the inner cartridge wall having an internal diameter that is constant over a total length of the cartridge wall up to the end face when the first film is disposed inside the reception chamber, and being nonreleasably connected to the cartridge wall,
    the end face further having a second film at a surface facing the reception chamber, the second film extending over the entirety of the end face and being a separate element from the first film and non-releasably connected to the end face, to the first film, and to the cartridge wall between the cartridge wall and the first film.

2. The cartridge in accordance with claim 1, further comprising
    a piston configured to be introduced into the reception chamber at an end of the cartridge that is remote from the end face, the piston being sealingly displaceable along the cartridge wall in the longitudinal direction.

3. The cartridge in accordance with claim 2, wherein the piston has a third film on a surface facing the reception chamber.

4. The cartridge in accordance with claim 1, wherein the cartridge wall has a wall thickness of at most 2 mm.

5. The cartridge in accordance with claim 3, wherein one of the first film, the second film, and the third film has a thickness of at most 0.2 mm.

6. The cartridge in accordance with claim 1, further comprising
    a connection device configured to connect the cartridge to a second cartridge.

7. The cartridge in accordance with claim 5, wherein one of the first film, the second film, and the third film is a multilayer system.

8. A multicomponent cartridge having at least two cartridges, each cartridge being designed in accordance with claim 1, wherein
    the two cartridges are capable of having one of a first arrangement and a second arrangement, the two cartridges being arranged next to one another with respect to the longitudinal direction in the first arrangement, the two cartridges being arranged in one another so that one cartridge surrounds the other cartridge in the second arrangement.

9. The multicomponent cartridge in accordance with claim 8, wherein
    the two cartridges are fixedly coupled to one another via a connection device.

10. The multicomponent cartridge in accordance with claim 8, wherein
    the two cartridges each include an outlet that forms a common connection piece configured to cooperate with an accessory part.

11. The multicomponent cartridge in accordance with claim 10, further comprising
    a closure part configured to cooperate with the connection piece and having two plugs, each of the plugs being configured to engage into a respective outlet of the outlets of the two cartridges to close the respective outlet.

12. The multicomponent cartridge in accordance with claim 8, wherein
    the reception chambers of the two cartridges have different volumes.

13. The multicomponent cartridge in accordance with claim 10, wherein
    the accessory part is one of a closure part and a mixer.

14. The cartridge in accordance with claim 2, wherein the innermost cartridge surface of the first film has a reduced friction in comparison to a surface of the cartridge wall.

15. The cartridge in accordance with claim 1, wherein the cartridge is made from biopolymers.

16. The cartridge in accordance with claim 4, wherein the cartridge wall has a wall thickness of at most 1.5 mm.

17. The cartridge in accordance with claim 4, wherein the cartridge wall has a wall thickness of at most 0.8 mm.

18. The cartridge in accordance with claim 5, wherein one of the first film, the second film, and the third film has a thickness of approximately 0.1 mm.

* * * * *